May 15, 1928.
F. F. F. BEHRENS
1,669,408
AUTOMOBILE SANDING DEVICE
Filed May 13, 1927
3 Sheets-Sheet 1
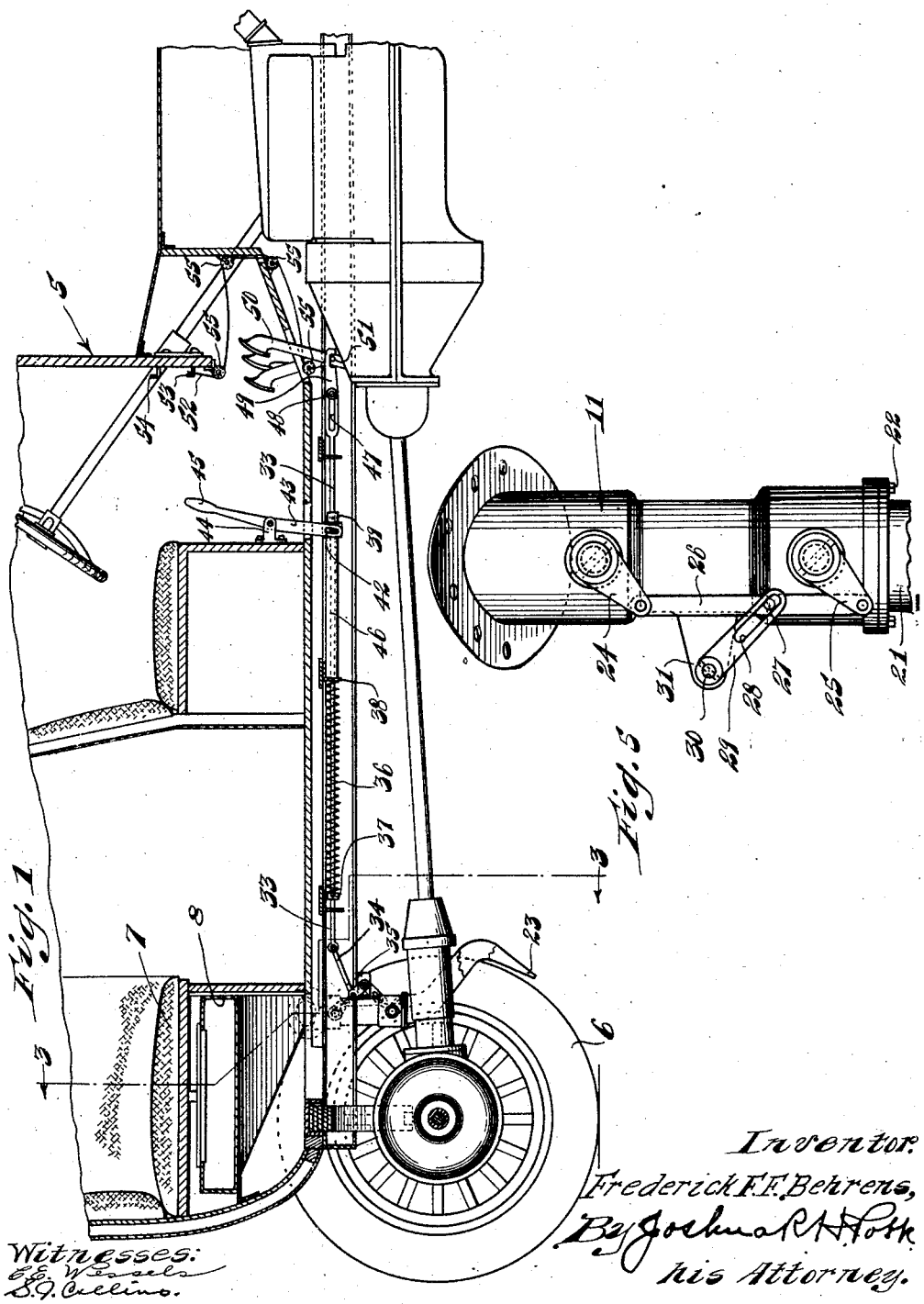
Inventor:
Frederick F.F. Behrens,
By Joshua R H Potk
his Attorney.

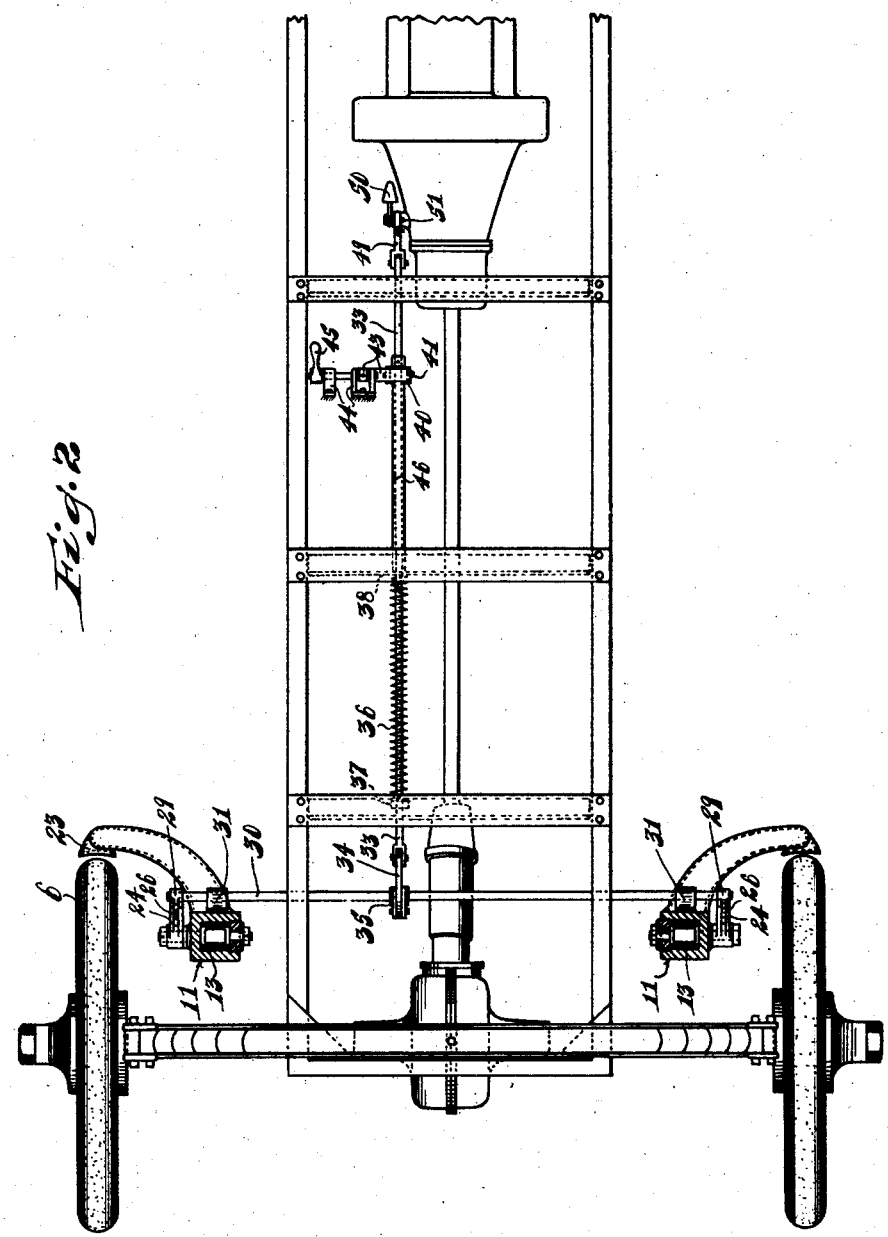

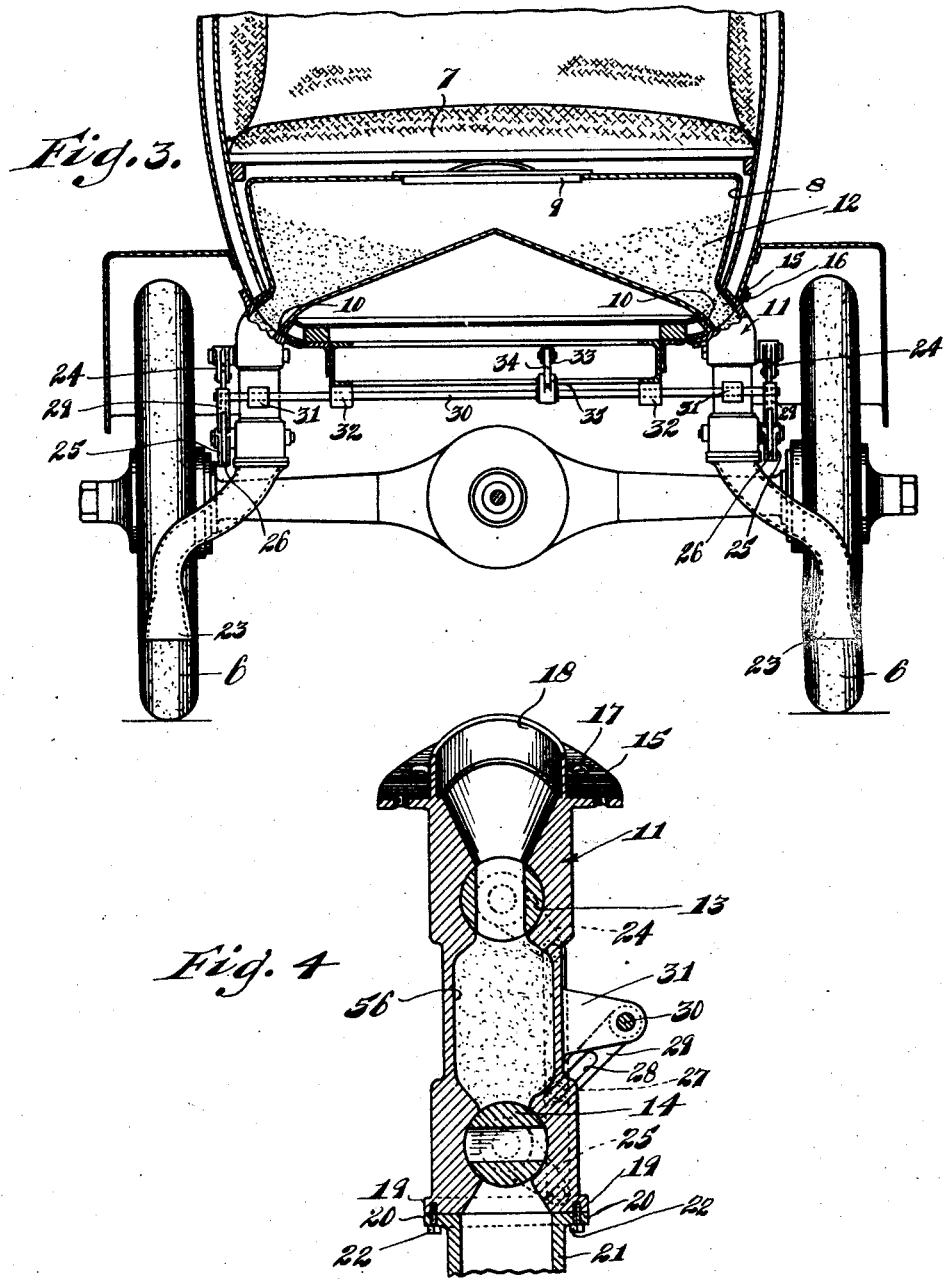

Patented May 15, 1928.

1,669,408

UNITED STATES PATENT OFFICE.

FREDERICK F. F. BEHRENS, OF CLARENDON HILLS, ILLINOIS, ASSIGNOR OF TWENTY-FIVE PER CENT TO VICTOR BEHRENS, OF CHICAGO, ILLINOIS.

AUTOMOBILE SANDING DEVICE.

Application filed May 13, 1927. Serial No. 191,009.

My invention relates to an automobile sanding device, and in particular to a device for distributing sand in the path of travel of the wheels of an automobile.

The object of my invention is to provide a device of the above indicated character which is relatively simple in construction, unlikely to get out of order, and is provided with a plurality of operating means therefor.

My invention will be best understood by reference to the accompanying drawings forming a part of this specification, and in which, Figure 1 is a horizontal sectional view of an automobile incorporating my invention.

Figure 2 is a horizontal sectional view of my invention disclosed in Figure 1.

Figure 3 is a cross-sectional view of the rear portion of that disclosed in Figure 1 and taken on approximately the line 3—3 of Figure 1.

Figure 4 is an enlarged sectional view of the valve arrangement incorporated in my invention and, Figure 5 is a plan view of that disclosed in Figure 4.

In the drawings and for the purpose of illustration I have shown the preferred embodiment of my invention in which 5 designates an automobile having wheels 6 and a rear seat 7. Under the rear seat 7 is positioned a sand box 8, of any suitable construction having an opening in the top and a cover 9 positioned within same. Said box is provided with a plurality of sand outlet extensions 10, which are connected to conduits 11 through which the sand 12 is adapted to flow when the rotary valves 13 and 14 are opened. The conduit 11 is provided with a flange 15 which is secured to the body of the automobile by means of suitable bolts 16 positioned through openings 17 in the flange 15. A reduced extension 18 on the upper end of the conduit 11 is adapted to fit over the sand outlet extension 10, as shown in Figure 3.

The bottom end of conduit 11 is provided with a flange 19 to which a similar flange 20 on the distributing member 21 is adapted to be secured by means of suitable bolts 22. The sand distributing member 21 is tubular in form at the upper end and is so formed and positioned as to extend from the conduit 11 to a position in front of the rear wheels and the extreme lower end thereof is flattened into a nozzle 23 for spreading sand as it passes through the same. The valves 13 and 14 within the conduit 11 are operated by means of arms 24 and 25 respectively. Said arms are connected together by a bar 26, and the bar 26 is provided with a pin 27 adapted to ride in the slot 28, in the crank 29, which is rigidly secured to an oscillatory shaft 30, by means of pin 31. The shaft 30 is mounted for oscillation through suitable bearings 31 and 32 and is adapted to be oscillated by means of the reciprocating rod 33 through the medium of link 34 and crank 35.

The rod 33 is normally held in its rearward position by means of the coil spring 36 which engages a nut 37 on said rod, and the other end of said spring 36 engages a portion 38 of the car frame. On the rod 33 is provided a nut 39, adapted to be engaged by a collar 40 and the collar 40 is provided with pins 41 which extend through slots 42 in the hand operating lever 43, as shown in Figure 1. The hand lever 43 is pivoted on a bracket 44 and is provided with a hand grip 45 on the upper end for operating the same. A tubular member 46 is positioned between the frame portion 38 and the collar 42 for the purpose of limiting the rearward extension of said rod 33. The forward end of rod 33 is provided with a slot 47 through which the pin 48 passes for the purpose of pivoting the latch 49 to said rod 33 and for allowing the rod 33 to reciprocate without interfering with the normal position of the latch 49.

When it is desired to operate my sanding device by means of the foot brake pedal 50, the latch 49 is allowed to operatively engage the pin 51 on the foot pedal 50, and when it is desired to operate the brake without operating the sanding device, it is necessary to release the upper end of cable 52 from the hook 53 and place it over the hook 54, which thereby draws the cable vertically passing it over the pulleys 55 and lifting the forward end of the latch 49 and disengaging the same from the pin 51, on the foot pedal 50.

The opening through valve 13 is considerably larger than the opening through valve 14, and the purpose of this arrangement is to permit the sand pocket 56 to be suddenly filled with sand when the operating means is so positioned as to open the valve 13. The valve 14 is smaller and gradually supplies sand to the distributing member over a considerable period of time. The valves 13 and 14 are adapted to oscillate through an angle of approximately 90 degrees and when operated to their limit against the force of the spring 36, the valve 13 becomes completely closed for preventing a continuous flow of sand from the sand box through the sand distributing member and this permits the operator to solidly hold his brake for an indefinite period without an excessive loss of sand supply. By means of the hand lever 45 and the disengaging lever 49, it is possible to distribute sand in the path of travel of the wheels when driving up a steep, slippery hill without the necessity of operating the brakes and by this arrangement it is obvious that sand may be distributed in the path of travel of the wheels when going up or down hill and with or without the use of brakes.

Having described my invention in its preferred form, it is obvious that variations may be made herein without departing from the spirit of the invention and accordingly I do not wish to be limited to the exact details of construction illustrated and described, but desire to avail myself of such variations and modifications as come within the scope of the appended claims.

I claim as my invention:

1. In combination with an automobile; wheels on said automobile and means for distributing sand in the path of travel of said wheels; a sand box for supplying sand to said distributing means; a conduit communicating with said sand box and said distributing means, for permitting sand to pass to said distributing means; said conduit having valves therein for regulating the passage of sand therethrough; means for permitting the flow of sand when the brake pedal is depressed and means for permitting the flow of sand independent of the operation of said brake pedal.

2. In combination with an automobile; wheels on said automobile and means for distributing sand in the path of travel of said wheels; a sand box for supplying sand to said distributing means; a conduit communicating with said sand box and said distributing means; a plurality of valves within said conduit; a sand pocket in said conduit between said valves; and manually operated means for controlling said valves; one of said valves adapted to admit a sudden flow of sand to said pocket and the other valve adapted to permit a gradual flow of sand from said pocket to said distributing means and the first said valve being adapted to shut off the supply of sand from said box when said operating means reaches its limit of movement.

In testimony whereof I have signed my name to this specification.

FREDERICK F. F. BEHRENS.